E. V. HARTFORD.
ANTIVIBRATION DEVICE FOR VEHICLES.
APPLICATION FILED DEC. 5, 1904.
1,080,630.
Patented Dec. 9, 1913.
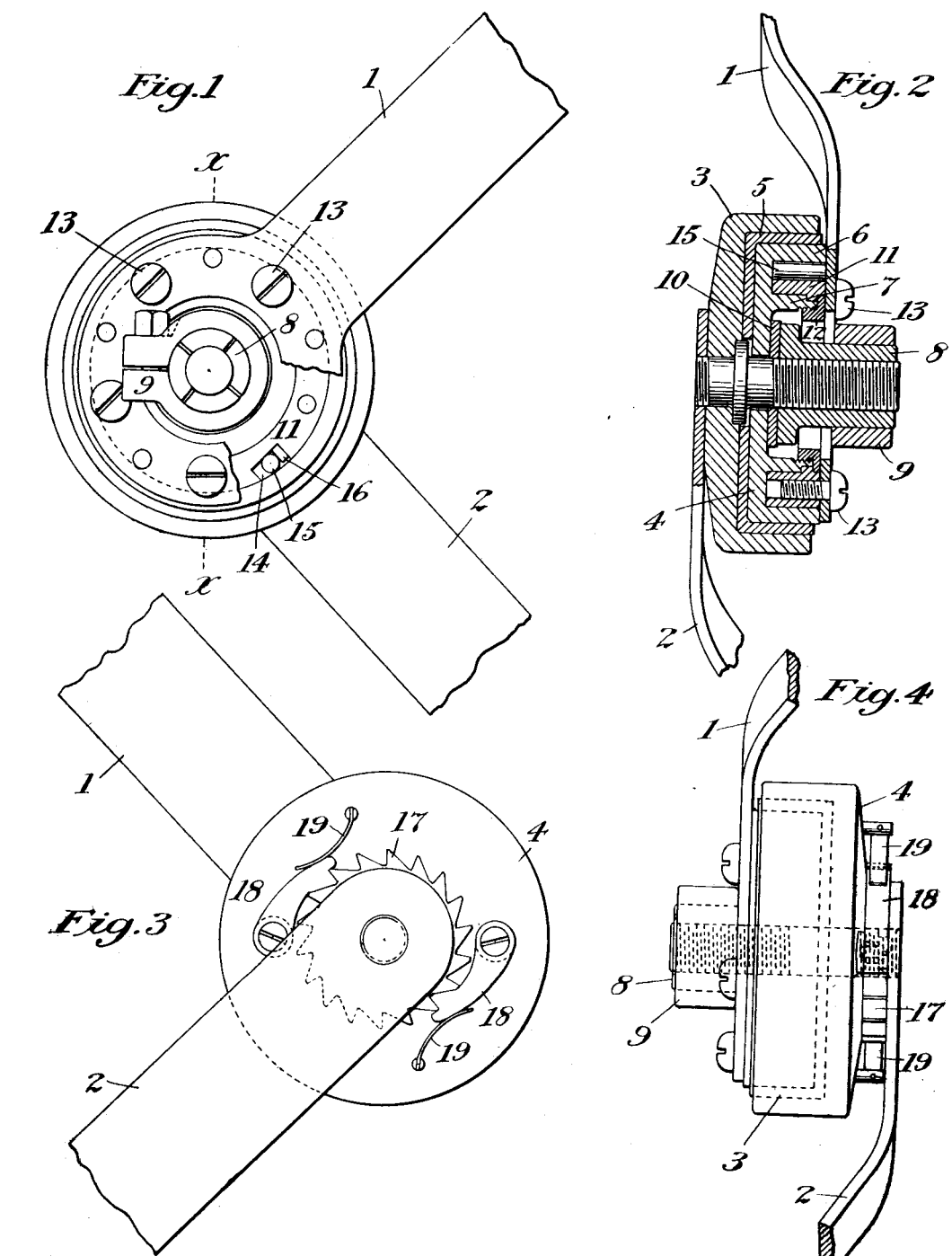
Witnesses:
Chas. W. King
Adolph F. Dinse
Inventor:
Edward V. Hartford
Dunn & Fink
Attys.

UNITED STATES PATENT OFFICE.

EDWARD V. HARTFORD, OF NEW YORK, N. Y.

ANTIVIBRATION DEVICE FOR VEHICLES.

1,080,630.  Specification of Letters Patent.  Patented Dec. 9, 1913.

Application filed December 5, 1904. Serial No. 235,475.

*To all whom it may concern:*

Be it known that I, EDWARD V. HARTFORD, a citizen of the United States, residing in New York city, county and State of New York, have invented certain new and useful Improvements in Antivibration Devices for Vehicles, of which the following is a full, clear, and exact specification.

My invention relates to devices for modifying or controlling the action of the supporting springs of vehicles, and especially to means for this purpose designed to modify the action of the springs when moving in one direction only. A device of this nature may be applied to a vehicle in such a way as to permit the free yielding of the springs under compressive stresses but to modify and control the reflex action or rebound of the springs, and this is the preferred application of my device. By the use of my invention in this manner, there is no tendency to stiffen the springs in the direction in which they move when taking up the shock incident to meeting an obstruction in the road but their full elasticity is secured at such times thereby permitting them to act quickly and in the most effectual manner. On the other hand by the action of the spring controlling devices on the elastic reflex movements of the springs, the rebound of the latter is retarded and checked and excessive rebound resulting in discomfort to those riding in the vehicle and possible damage to the springs is prevented.

More specifically stated my invention comprises the application of a friction device or mechanism to the suspension of a vehicle in such manner and by the use of such connecting or power transmitting means that the friction device is caused or enabled to exert its controlling or retarding action upon the vehicle springs for one direction of movement only, such direction being preferably that of the rebound.

I have illustrated in the drawings forming a part of this application, my invention as embodied in a shock absorber or anti-vibration device of the type having engaging friction disks, two forms of connections for the disks causing operative frictional action thereof in one direction only, being shown. My invention is not limited, however, to this type of device as any other suitable form of device capable of and so connected as to produce modification of the spring action in one direction only, wholly or partly by the action of friction, falls within the purview of my invention as defined in the appended claims.

In the drawings Figure 1 is a side elevation of a device embodying a preferred form of my invention, a portion of the outer case being shown broken away for the sake of clearness; Fig. 2 is a sectional view taken on line X—X of Fig. 1; Fig. 3 is a side elevation of a modified form of a device of the type illustrated in Fig. 1 and also embodying my invention; and Fig. 4 is an end view of such modified form.

I have not in these figures illustrated the mode of attachment of the devices to a vehicle as the same is well understood in the art and may be varied to suit the character of the specific embodiment of my invention employed or the conditions of use. The forms of apparatus illustrated may for example be mounted as shown in patent to Truffault No. 743,995.

Referring to the drawings in detail, and particularly to Figs. 1 and 2, the reference characters 1 and 2, represent the power arms by which the device is connected to the body portion and running gear of the vehicle, respectively. 3, is a recessed disk to which the power arm, 2, is rigidly secured by any well known means. 4, is a second disk adapted to fit partially within the recess of disk 3, and, 5, represents any well known friction material such as leather, fiber or the like, which serves to form a wearing surface between the two. The disk 4, has laterally extending collars or portions, 6, and, 7, and it is held in place by a nut, 8, which latter is firmly retained by the split nut-lock, 9, the nut, 8, being itself split for this purpose and for ease of adjustment. Suitable friction material, 10, is interposed between the nut and the disk, 4, as may be desired. Within the recess between the collars, 6, and, 7, of the disk, 4, is located the cylindrical power member, 11, which is retained in place by means of the nut, 12, screwing into the threaded portion on the outer end of the collar, 7, and the arm, 1, terminating in a circular end, is secured by bolts, 13, to the said power member as will be clearly seen in Fig. 1. The said power member has oblique shaped recesses, 14, disposed around its circumference (see Fig. 1) and in these recesses are located suitable rollers, 15, which are of such size as will permit the parts to rotate in one direction, but which will jam and cause the power member and disk 4, to operate as if integral, when the roller reaches the narrow portion of the recess. A small spring, 16, may be used to keep the roller in a position always ready to operate and may be mounted in any suitable manner.

It will be readily seen that any compression or approaching of the arms, 1, and 2, in the structure shown in Fig. 1, will merely move the power-member, 11, without causing any relative movement of the disks, 3, and, 4, the roller and spring yielding to this movement, but upon the recoil of the spring suspending means, the roller, 15, runs into the narrow portion of the groove and locks the power member, 11, and the disk, 4, together, and the continued upward movement of the arm, 1, only takes place with a corresponding movement of the disk, 4, and thus the action of the spring suspended means is retarded to any desired extent. The friction between the disks, 3, and 4, may be regulated by the nut, 8, which can then be set rigidly by means of the nut-lock, 9, and any given degree of retarding or braking action is secured.

In the construction shown in Figs. 3 and 4 there is a friction disk 3 (provided with a power arm 1,) with which the recessed friction disk 4 is adapted to engage, the degree of friction being regulated by a bolt and regulating nut connecting the two, which may be of any well known construction. The disk 4 carries pawls 18, 18 which, by means of springs, 19, 19 are made to engage with the teeth of the ratchet wheel 17, revolving loosely on the bolt, but which has rigidly secured to it the power arm 2. When the power arms 1 and 2 are moved toward one another from the position shown in Fig. 3, the pawls pass readily over the oblique teeth of the ratchet, but upon the opposite movement the pawls engage the ratchet and cause the recessed disk to rotate. This movement takes place reluctantly, however, owing to the friction between the disks 3 and 4. Suitable friction material may be interposed between the disks in the manner similar to that described in the construction of Figs. 1 and 2.

It will thus be seen that a frictional retarding device is provided which acts only upon relative movement of the vehicle parts in one direction, this result being secured by providing connections for operating such friction device which act to transmit power thereto only when moved in one direction.

In the particular form shown in the drawings it will be noted that the pressure between the two friction plates is always constant and that the frictional retarding action produced by the friction between the plates is substantially constant and uniform at all times during the relative movement thereof. The position of the levers and the small amount of movement which each lever is caused to make in the normal running of a vehicle changes the theoretical leverage to such a small amount that the friction may be said to act substantially constant upon the arms. It thus results that the frictional retarding action upon the expansion of the spring is uniform and substantially constant at all times, which renders the device extremely efficient. It will also be noted that the relative movement between the friction plates when in operation is small compared with the movement of the spring-separated parts and thus wear upon the parts is reduced to a minimum. It is to be understood, however, that the frictional retarding mechanism of my invention need not necessarily produce a uniform resistance throughout its movement or possess the other characteristics of the friction elements of the particular embodiments of my invention illustrated.

My invention resides primarily in the use of friction mechanism of any suitable character so connected to relatively moving parts of the vehicle suspension as to permit such relative movement in one direction without actively operating the friction mechanism while a reverse movement of the vehicle parts produces such action with the resultant desired control of the springs and reduction of undesirable vibration.

In the drawings I have shown but two methods whereby the retarding action is brought into operation by movements in one direction only, but I do not wish to limit myself to these specific means shown as numerous others may be devised and my invention may be embodied in many other forms without departing from the spirit thereof.

Having thus described my invention, I claim:—

1. An antivibration device for vehicles comprising a plurality of outer friction disks, a hub connecting said disks, an inner friction disk moving freely upon said hub, friction material between the opposed faces of said outer disks and said inner disk, and connections between said outer disks and said inner disk to the body and running gear respectively of a vehicle, means whereby one of said connections may be moved freely in one direction and for interposing frictional resistance to its movement in the other direction.

2. An antivibration device comprising a recessed friction-disk, a second disk located partially within said recess, friction material between said disks, adjustable clamping means, a power member adjacent to one of said disks, oblique faced recesses in said member and rollers located in said recesses and adapted to transmit the movement of the power member in one direction only to the adjacent disk.

3. An anti-vibration device for vehicle body supporting springs permitting the free compression of the spring and retarding the expansion of the spring, comprising two frictionally-engaged parts, and a third part constructed and adapted to be clutched to and released from one of the frictionally-engaged parts according to the direction in which the said third part is moved.

4. An anti-vibration device for vehicle body supporting springs arranged to permit the free compression of the spring and to retard the expansion of said spring, comprising two frictionally-engaged parts, a third part, and a clutch interposed between the third part and one of the frictionally-engaged parts for locking and releasing the third part according to the direction of its movement.

5. An anti-vibration device for vehicle body supporting springs arranged to permit the free compression of the spring and to retard the expansion of said spring, comprising two frictionally-engaged parts, a third part and a roller clutch interposed between the third part and one of the frictionally-engaged parts for locking and releasing the third part according to the direction of its movement.

6. An antivibration device for vehicles comprising a pair of friction members, centrally-located, adjustable clamping means for regulating the pressure between said members, operating arms connected radially to said members, one of said arms being rigidly connected to one member, the other arm being located in position and adapted to be clutched to and released from the other member, according to the direction of rotation of said arm.

7. An antivibration device for vehicles comprising a plurality of friction members in operative engagement, an operating arm secured directly to one of said members, a second operating arm, and a clutching device for connecting the said second operating arm with the other friction member so as to operate said member when the said arm is moved in one direction, and to permit said arm to move without operating it when moved in the opposite direction.

8. An antivibration device for vehicles comprising a plurality of friction members in operative engagement, adjustable means for regulating the pressure between said members, an operating arm secured directly to one of the said members, a second operating arm, and a clutching device for connecting the said second operating arm with the other friction member so as to operate said member when moved in one direction, and to move without operating it when moved in the opposite direction.

9. An anti-vibration device adapted to be interposed between relatively movable parts of a vehicle having elastic suspension means, said device comprising a friction mechanism and an operative connection adapted to connect said mechanism with one of said relatively movable vehicle parts, said connection being capable of transmitting power to functionally operate said friction mechanism in one direction of movement but being functionally inoperative upon the reverse movement of the parts.

10. An anti-vibration device adapted to be interposed between the body and running gear of a vehicle having spring suspension means, said device comprising a friction mechanism and an operative connection adapted to connect said mechanism with a vehicle part movable relatively thereto, said connection acting to transmit power to operate said friction mechanism during the rebound movement of the spring but being functionally inoperative with respect to said friction mechanism during the initial movement of the spring.

11. An anti-vibration device comprising a frictional controlling mechanism for a vehicle body supporting spring capable of exerting frictional resistance to movements of the spring in one direction only, and means for setting said device during movement of the spring in one direction in condition to retard the succeeding movement of the spring in the other direction.

12. An anti-vibration device for vehicles having elastic suspension means, comprising a friction producing mechanism and an operative connection adapted to connect said friction mechanism to a vehicle part, said connection being capable of transmitting power to functionally operate said friction mechanism when moved in one direction but being functionally inoperative with respect thereto when moved in the opposite direction, and means for setting said device during the latter movement in condition to exert a frictional retarding action during the next succeeding movement in the other direction.

13. An anti-vibration device for a vehicle having elastic suspension means, comprising a friction mechanism and a one-way-operative connection adapted to connect said mechanism with one of the relatively movable members of the vehicle suspension, said one-way-operative connection permitting movement of the suspension means in one direction without causing operative relative movement of the friction surfaces of the friction device but actuating said friction device upon the reverse movement of the suspension means.

In testimony whereof I have hereunto set my hand in the presence of two subscribing witnesses.

EDWARD V. HARTFORD.

Witnesses:
A. C. FISCHER,
ADOLPH F. DINSE.